United States Patent
Banerjee et al.

(10) Patent No.: US 10,360,569 B2
(45) Date of Patent: Jul. 23, 2019

(54) UTILIZING PHYSICAL COOKIES TO CONNECT PHYSICAL WORLD EXPERIENCES TO DIGITAL WORLD OUTCOMES

(71) Applicant: International Business Machines Corporation, Armonk, NY (US)

(72) Inventors: Dipyaman Banerjee, New Delhi (IN); Prasenjit Dey, Bangalore (IN); Palanivel A. Kodeswaran, Bangalore (IN); Sheetal Manan Sureka, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 437 days.

(21) Appl. No.: 14/885,733

(22) Filed: Oct. 16, 2015

(65) Prior Publication Data

US 2017/0109425 A1 Apr. 20, 2017

(51) Int. Cl.
*G06F 17/30* (2006.01)
*G06Q 30/02* (2012.01)

(52) U.S. Cl.
CPC .................. *G06Q 30/02* (2013.01)

(58) Field of Classification Search
CPC ........ G06F 17/30598; G06F 17/30539; G06Q 30/02
See application file for complete search history.

(56) References Cited

U.S. PATENT DOCUMENTS

| 8,452,653 | B1* | 5/2013 | Gottfurcht | G06Q 20/105 705/14.25 |
| 2011/0246300 | A1* | 10/2011 | Yarvis | G06Q 30/02 705/14.53 |
| 2012/0084151 | A1* | 4/2012 | Kozak | G06Q 30/02 705/14.58 |
| 2014/0164111 | A1* | 6/2014 | Rodriguez | G06Q 30/0255 705/14.53 |

(Continued)

FOREIGN PATENT DOCUMENTS

WO    WO2012021633 A2    2/2012

OTHER PUBLICATIONS

Monreale, Anna et al., "WhereNext: a Location Predictor on Trajectory Pattern Mining", KDD'09, Jun. 28-Jul. 1, 2009, Paris, France, 9 pages, ACM Digital Library.

(Continued)

*Primary Examiner* — Huawen A Peng
(74) *Attorney, Agent, or Firm* — Ference & Associates LLC

(57) ABSTRACT

Methods and arrangements for associating physical activities and digital activities of a user. A plurality of physical attributes of the user are collected, via mining sensor data from at least one physical state associated with the user and a plurality of digital attributes relating to at least one digital activity of the user via mining the data from a digital presence of the user. A plurality of physical attributes and digital attributes are grouped based on a similarity measure. There are stored a grouping of the physical and digital attributes at a data storage location. Other variants and embodiments are broadly contemplated herein.

20 Claims, 4 Drawing Sheets

(56) References Cited

U.S. PATENT DOCUMENTS

2014/0316848 A1* 10/2014 Fuchs ............... G06Q 30/02 705/7.29
2015/0262201 A1* 9/2015 Rao ............... G06Q 30/0201 705/7.29
2016/0283992 A1* 9/2016 Zamer ............. G06Q 30/0605

OTHER PUBLICATIONS

Anagnostopoulos, Theodoros, et al., "An Online Adaptive Model for Location Prediction", Autonomics 2009, LNICST 23, 16 pages, Institute for Computer Sciences, Social-Informatics and Telecommunications Engineering 2010.

Zheng, Yu et al., "Mining Interesting Locations and Travel Sequences from GPS Trajectories", WWW2009, Apr. 20-24, 2009, Madrid, Spain, 10 pages, ACM Digital Library.

Karimi, Hassan A. et al., "A Predictive Location Model for Location-Based Services", GIS'03, Nov. 7-8, 2003, New Orleans, Louisiana, USA, 8 pages, ACM Digital Library.

Yavas, Gokhan et al., "A data mining approach for location prediction in mobile environments", Elsevier, Data & Knowledge Engineering 54, 2005, 26 pages, Available online at www.sciencedirect.com, Elsevier B.V., Amsterdam, Netherlands.

Kose, Mustafa et al., "Online Human Activity Recognition on Smart Phones", 2nd International Workshop on Mobile Sensing, Apr. 16, 2012, Beijing, China, 5 pages, ACM Digital Library.

Koch, Fernando et al., "A Platform for Citizen Sensing in Sentient Cities", CitiSens 2012, LNAI 7685, 10 pages, Springer-Verlag Berlin Heidelberg 2013.

Mislove, Alan et al., "You Are Who You Know: Inferring User Profiles in Online Social Networks", WSDM'10, Feb. 4-6, 2010, New York City, New York, USA, 10 pages, ACM Digital Library.

Li, Jiwei et al., "Weakly Supervised User Profile Extraction from Twitter", ACL, Baltimore, 2014, 10 pages, http://www.cs.cmu.edu/~jiweil/papers/ACL2014_twitter.pdf, Carnegie Mellon University, Pittsburgh, PA, USA.

* cited by examiner

UTILIZING PHYSICAL COOKIES TO CONNECT PHYSICAL WORLD EXPERIENCES TO DIGITAL WORLD OUTCOMES

BACKGROUND

The use of digital attributes stored in the cookies of personal devices has proliferated and there has come to exist an abundance of data in the form of individual information from a user. Such datasets are rich in information and have consequently attracted much attention in disciplines relating to data analytics. Digital datasets have been mined and analyzed for applications such as tracking the websites a user frequents including those used for shopping or general interests. Typically, a digital dataset can be regarded as being indicative of the activity preference of the user.

Generally, in analyzing the digital dataset, physical attributes stored by sensor device cookies of a user's personal device such as a smart phone, have not yet been grouped with the digital activity of the user. This combination of information of physical and digital information can lead to pinpointing one or more interests/habits of an individual user. With sensors becoming ubiquitous, ranging from smart phone sensors to sensors embedded in the digital infrastructure of a user, people are creating personal traces of both digital activity as well as physical location activity. Combined, these activity and location traces indicate future activity of a user. Challenges continue with respect to completely sharing and combining both the digital and physical information gleaned from a user.

BRIEF SUMMARY

In summary, one aspect of the invention provides a method of associating physical activities and digital activities of a user, said method comprising: utilizing at least one processor to execute computer code that performs the steps of: collecting a plurality of physical attributes relating to at least one physical activity of the user, via mining sensor data from at least on physical state associated with the user; collecting a plurality of digital attributes relating to at least one digital activity of the user, via mining data from a digital presence of the user; grouping at least one of the plurality of the physical attributes and at least one of the plurality of the digital attributes based on a similarity measure, wherein the similarity measure involves identification of relatedness of at least one of the physical attributes to at least one of the digital attributes; and storing data from said grouping at a data storage location.

Another aspect of the invention provides an apparatus for associating physical activities and digital activities of a user, said apparatus comprising: at least one processor; and a computer readable storage medium having computer readable program code embodied therewith and executable by the at least one processor, the computer readable program code comprising: computer readable program code configured to collect a plurality of physical attributes relating to at least one physical activity of the user, via mining sensor data from at least one physical state associated with the user; computer readable program code configured to collect a plurality of digital attributes relating to at least one digital activity of the user, via mining data from a digital presence of the user; computer readable program code configured to group at least one of the plurality of the physical attributes and at least one of the plurality of the digital attributes based on a similarity measure, wherein the similarity measure involves identification of relatedness of at least one of the physical attributes to at least one of the digital attributes; and computer readable program code configured to store data from the grouping at a data storage location.

An additional aspect provides a computer program product for associating physical activities and digital activities of a user, said computer program product comprising: at least one processor; and a computer readable storage medium having computer readable program code embodied therewith and executable by the at least one processor, the computer readable program code comprising: computer readable program code configured to collect a plurality of physical attributes relating to at least one physical activity of the user, via mining sensor data set from at least one physical state associated with the user; computer readable program code configured to collect a plurality of digital attributes relating to at least one digital activity of the user, via mining data from a digital presence of the at least one user; computer readable program code configured to group at least one of the plurality of the physical attributes and at least one of the plurality of the digital attributes based on a similarity measure, wherein the similarity measure involves identification of relatedness of at least one of the physical attributes to at least one of the digital attributes; and computer readable program code configured to store data from the grouping at a data storage location.

A further aspect of the invention provides a method comprising: collecting physical and digital data attributes of a user for a business enterprise; querying said collected physical and digital attributes of a user; and brokering aggregate profiles of the user via: grouping the physical and digital attributes of a user based on a similarity measure, wherein the similarity measure comprises an identification of relatedness of the physical and digital attributes; and determining the target demographic from the physical and digital attributes of a user.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
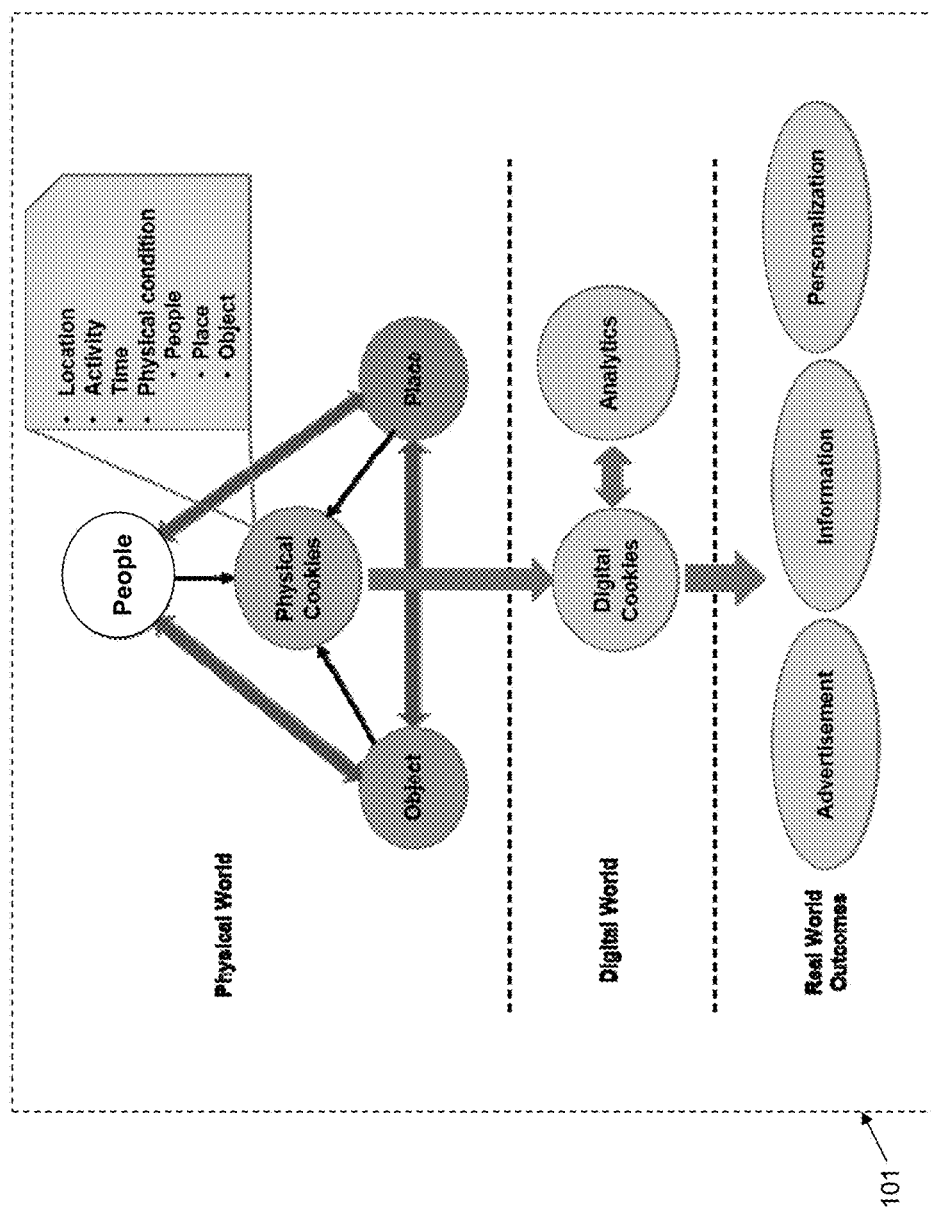
FIG. 1 schematically illustrates a general concept of the interaction between people, places and objects that create a user's physical and digital activity profile.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which serve to collect traces of interaction between people, places, and objects. This can involve creating traces using a client application ("app") that collects a user's physical context including location traces, automotive state and environmental state. This can also involve processing raw sensor data to derive meaningful physical contexts such as walking, being located in a shopping mall, etc. Additionally, there may be a provision for digital cookies (such as browsing patterns) that are obtained from browser plugins, smart phone applications, online social media updates, etc. As such, this scenario of combining both the physical and digital activity of a user can involve an individual who is, for example, a vegetarian routinely shopping at an all natural grocery store and routinely paying by method of a mobile phone application. Upon dissemination of the activity and habits, this user would be an ideal candidate for a coupon from the grocery store along with a cash back award from the mobile phone application provider.

Further, there is broadly contemplated herein, in accordance with at least one embodiment of the invention, a system for providing recommendations in the physical and digital world by combining digital and physical signatures of users. This can involve using a scalable cloud service to store and manage physical and digital cookies; entity matching can be performed, and physical and digital cookies can be combined to create discriminative signatures for users. This can also involve using the discriminative features to recommend services in the physical world (e.g., restaurants) as well as digital world (e.g., advertisements). Also broadly contemplated herein is a brokering platform that accepts extracted user attribute information that is fused with the digital attributes of a user. The information is then used by third party enterprises to query and consume enriched user profiles; here, an enterprise can query the system to obtain aggregate profiles of users visiting them, and can send coupons to target audiences conditioned on the combined digital-physical signatures.

The features discussed above, and others, relating to at least one embodiment of the invention, will be better appreciated from the discussion which follows.

In accordance with at least embodiment of the invention, FIG. 1 schematically illustrates a general concept (101) of the interaction between people, places and objects that create a user's physical and digital activity profile. The interaction of people, places and objects creates traces of activity, location, time, environment and physical condition, etc. The cookies could be collected by any of these entities. Particularly, people could collect traces of the location and objects, places could collect traces of people and objects they interact with, and objects could collect traces of people and places they interact with. These general traces of different properties of person, places, or objects are what can be called "physical cookies", relative to a physical state of a user; "physical state" can refer to a user's physical location, or a state of ongoing physical activity (e.g., walking or running), or other aspects of these states (e.g., a time during which an activity is undertaken or at which a physical place is visited). These physical cookies can be combined with existing cookies in the digital world to obtain even richer experiences and effective outcomes for problems in the real world.

Figure 2:
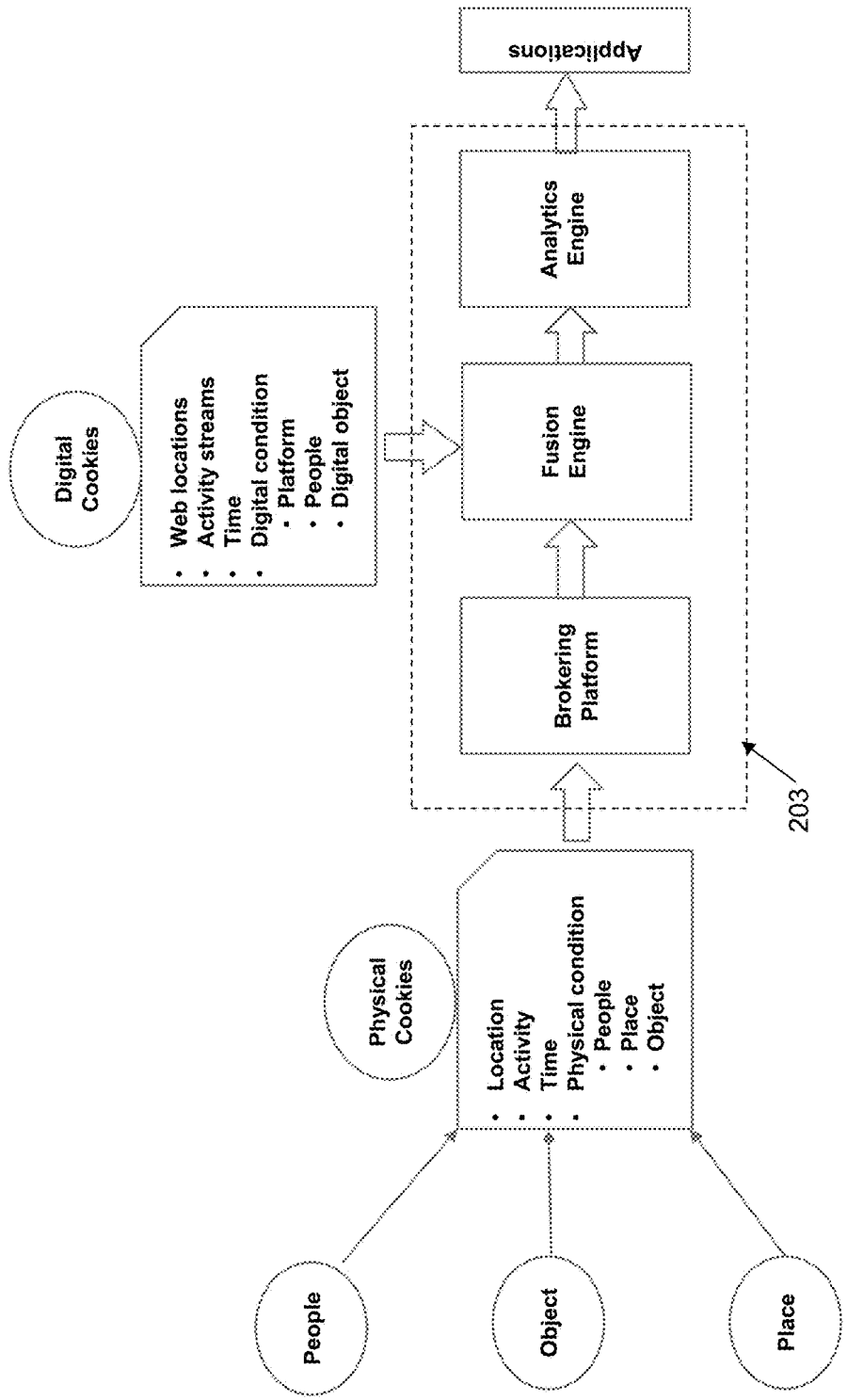
FIG. 2 schematically illustrates an overview of a system architecture.

FIG. 2 schematically illustrates an overview of a general system architecture, in an accordance with at least one embodiment of the invention. As shown, and as will be more fully appreciated herebelow, a processing system (203) accepts physical cookies and digital cookies as inputs, and then provides outputs in the form, e.g., of applications that can be used by third parties. Processing system 203, as shown, includes a brokering platform, a fusion engine and an analytics engine. Generally, the brokering platform provides an initial processing of data from the physical cookies, while the fusion engine combines such processed data with data from digital cookies as shown. The analytics engine then resolves the combined data in a form suitable for output (e.g., as applications for use by third parties). Further details may now be appreciated from the ensuing discussion.

In accordance with at least one embodiment of the invention, and with continued reference to FIG. 2, user attribute extraction, which provides for the processing of raw physical and digital data (i.e., physical and digital cookies, as illustrated), is used to infer user habits or preferences. User attribute extraction enables the processing of raw physical or digital data (e.g., in the form of physical and digital cookies) that is specific to the user and indicates a characteristic(s) or habit(s) possessed by that user. Physical attributes can be gathered from a mobile device or a sensor of activity (for example, a wearable device), such as walking or running in a particular geographic area. Any other sensor device associated with the user such as, but not limited to, a near field communication device or a short range wireless communication device, as well as any small wireless sensor that is attachable to any location or object unlocking micro-location and contextual awareness detecting the presence of nearby objects or any business establishment can provide physical data. The physical data can also be extracted from smart environments or smart rooms. In this classification of physical information, the attribute data are generated from physical properties of the user detected by, but not limited to, a wireless connection, a GPS device, camera, etc. This information can reveal several characteristics of a user's preference and/or spending habits as well as lifestyle habits.

As will be further appreciated herein, given this information, trajectory data can be used to infer a user's top K (most influential) locations in conjunction with their preferences such as, but not limited to, dining and/or shopping habits. Input in the form of digital cookies can then include digital attributes which can also be inferred by the user's top K topics from web browsing history. The brokering platform, in conjunction with the fusion engine, will identify additional user attributes such as, but not limited to, preference(s) and spending and/or lifestyle habits attributed to digital or browsing activity including, but not limited to, web address locations that have been visited, activity streams, and digital platforms. The merging (or grouping) of these user data attributes creates a user profile by aggregating ranked lists or unification of the data that have been collected.

In accordance with at least one embodiment of the invention, via the analytics engine, the information from the physical and digital sources will then be assessed by similarity measures and profile analytics including, but not limited to, entity matching. The entity matching can combine the same user's information in order to determine a more complete user profile, and similarity measures can include real-valued functions that quantify the similarities or sameness between at least two of the different user attributes. The holistic customer insights that are merged and attributable to both physical and digital activities create a profile that identifies the user's signature which is continually updated and available to be queried by a third party enterprise entity for target marketing; e.g., the profile can then be utilized in an application that is made available to a third party. In accordance with at least one variant embodiment, a subset of attributes can be identified from the grouping of data from physical and digital sources relative to a user, based on any of a wide variety of predetermined filter criteria. Such filter criteria, for example, could yield a subset of attributes that encompasses content specific to the user (as opposed to content not directly related to the user).

Thus, the result is a signature that has been created specific to the user and can indicate habits of the user which may include, for example, spending habits associated with expensive or thrifty tendencies or an affinity for specific types of restaurants and cuisine types as well as a healthy or non-healthy lifestyle. This signature could also provide information relating to a user's hobbies or activities attended or participated in. The entirety of this information can then be considered and a determination can be made regarding information provided to the user. For example, the proximity of a healthy individual that attends sports events near a vegan grocery store can determine whether this consumer will be sent information (or coupons) regarding the surrounding establishments. The user may then be more likely to visit one of the establishments based on their profile and the prompting they receive.

Generally, it should be appreciated that embodiments of the invention can track and combine physical world activities in the digital world, wherein the operation of the physical cookies is as seamless as cookies in the digital world. This can provide a unified framework to take physical experiences into the digital world, and can make the digital world experiences much more personal and rich by combining the physical world experiences which are currently not tracked easily.

It can be appreciated from the foregoing that, in accordance with at least one embodiment of invention, a technical improvement is represented at least via methods and arrangements which serve to collect traces of interaction between people, places, and objects; this can involve creating traces using a client application ("app") that collects a user's physical context including location traces, automotive state (for example, the proximity and speed of the vehicle) and environmental state (for example, the location of a user whether indoor or outdoor, running, walking, etc).

In brief recapitulation, it can be appreciated that, in accordance with at least one embodiment of the invention, a combination of physical and digital interactions can provide a novel signature or trace of user activity by fusing the extracted information from both physical and digital cookies. The physical cookie creation occurs via using activity data vectors (running, walking, etc.) along with proximity verification data and the top K (preferred location data). This collection of user signature information is compiled within a bank of information which can then be used as a brokering platform allowing an entity to share and query the platform for user profiles; here, an enterprise can query the system to obtain aggregate profiles of users visiting them. The merging of both the physical and digital profiles of a user provides an integrated framework to combine the totality of the information.

In accordance with at least one embodiment of the invention, very generally, quantitative values as determined herein, or other data or information as used or created herein, can be stored in memory or displayed to a user on a screen, as might fit the needs of one or more users.

Figure 3:
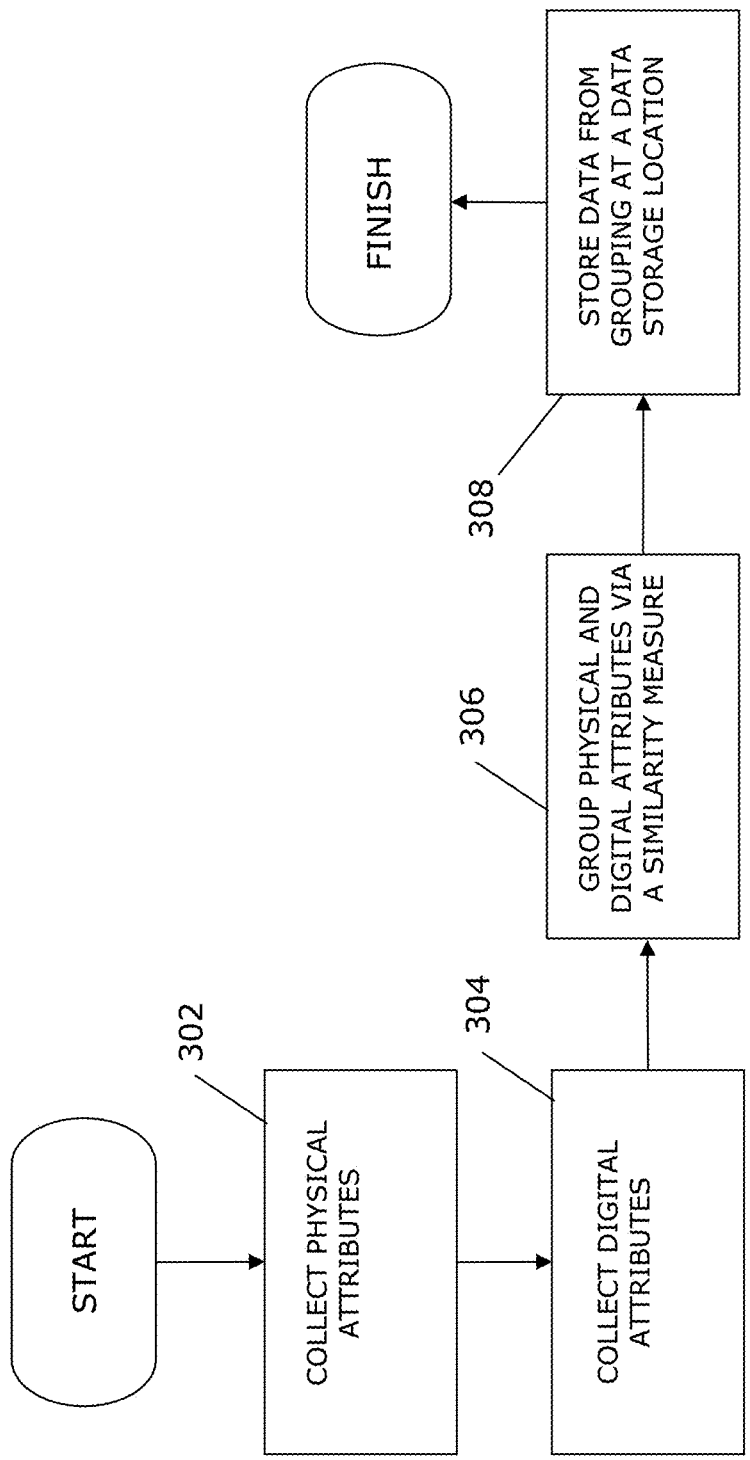
FIG. 3 sets forth a process more generally grouping and storing physical and digital attributes.

FIG. 3 sets forth a process more generally for associating physical activities and digital activities of a user, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a plurality of physical attributes relating to at least one physical activity are collected, wherein the collecting comprises a plurality of physical attributes relating to at least one physical activity of the user, via mining sensor data from at least one physical state associated with the user (302). A plurality of digital attributes relating to at least one digital activity of the user are collected, via mining data from a digital presence of the user (304). There are grouped at least one of the plurality of the physical attributes and at least one of the plurality of the digital attributes based on a similarity measure, wherein the similarity measure involves an identification of a relatedness of a physical attribute to a digital attribute (306). The data from said grouping is stored at a data storage location (308).

Figure 4:
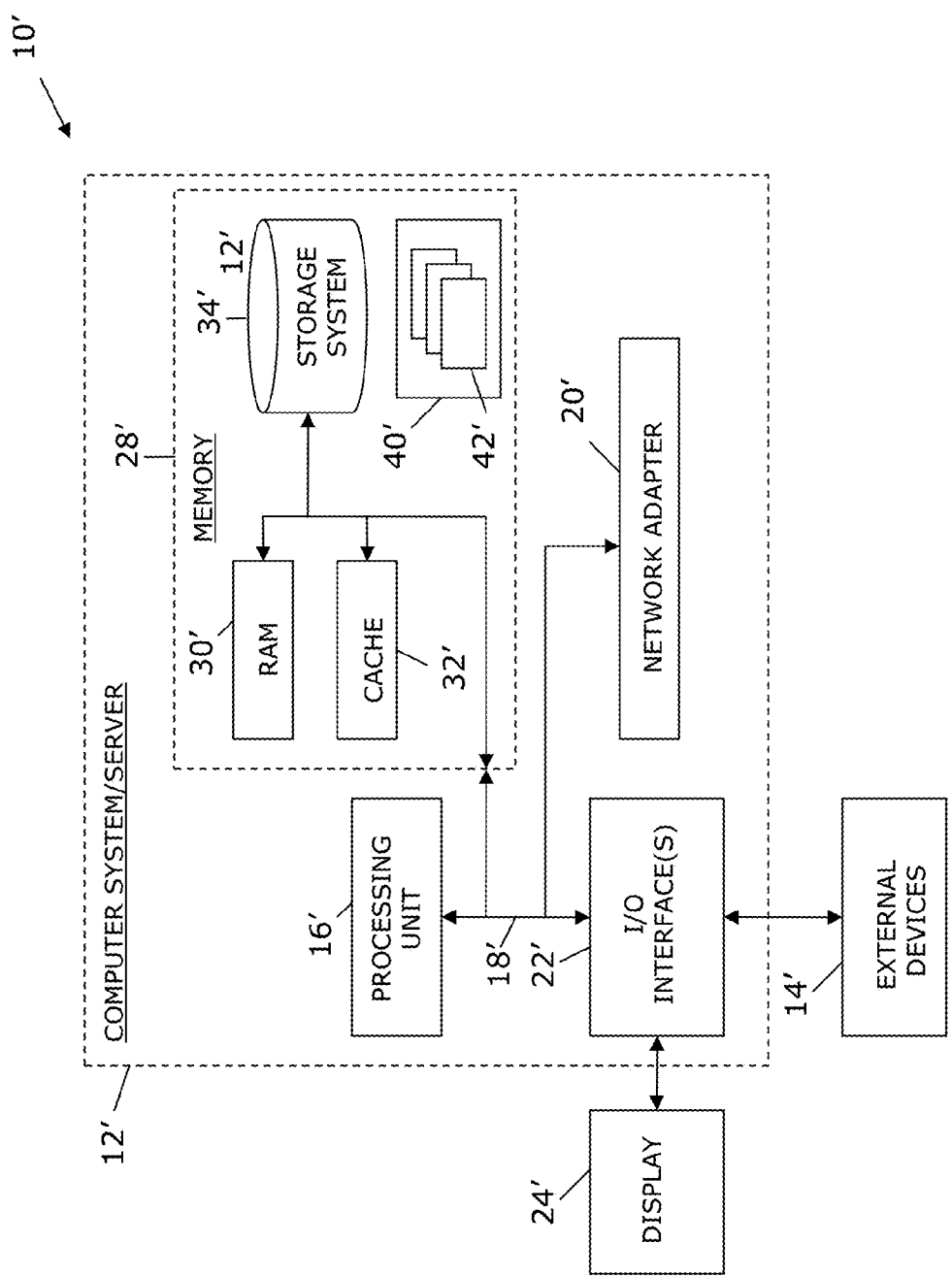
FIG. 4 illustrates a computer system.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of associating physical activities and digital activities of a user, said method comprising:
   utilizing at least one processor to execute computer code that performs the steps of:
   collecting, within an application by creating traces identifying properties related to at least one physical activity of a user, a plurality of physical attributes relating to the at least one physical activity of the user, via mining sensor data from at least one physical state associated with the user and a physical location of the user;
   collecting, at the application by creating traces identifying properties related to at least one digital activity of the user, a plurality of digital attributes relating to the at least one digital activity of the user, via mining data from a digital presence of the user;
   grouping, into a group of attributes, at least one of the plurality of the physical attributes and at least one of the plurality of the digital attributes based on a similarity measure, wherein the similarity measure involves identification of relatedness of at least one of the physical attributes to at least one of the digital attributes and predetermined filter criteria;

generating a user signature from the grouped attributes and that indicates lifestyle habits of the user, wherein the generated user signature is updated responsive to collection of attributes; and providing at least one application created from the generated user signature to at least one third party.

2. The method of claim 1, comprising identifying a subset of attributes from said grouping, based on predetermined filter criteria.

3. The method of claim 2, wherein the subset of attributes comprises content specific to the user.

4. The method according to claim 1, wherein said collecting of a plurality of physical attributes comprises obtaining and processing stored sensor data.

5. The method according to claim 4, wherein said processing of stored sensor data comprises using sensor data selected from the group consisting of: a location associated with the user, an automotive state, and an environmental state.

6. The method according to claim 1, wherein said collecting of a plurality of digital attributes comprises processing stored Internet activity data.

7. The method according to claim 1, wherein said storing comprises employing a scalable cloud service for storage and for managing physical and digital cookies.

8. The method according to claim 1, wherein said grouping comprises associating physical activities and digital activities via data entity matching.

9. The method according to claim 1, wherein said storing at a data storage location comprises:

physical attributes collected from the user's data sensor information;

digital attributes collected from the user's internet activity; and mined descriptive features of the attributes to determine similarity.

10. The method according to claim 1, comprising obtaining enriched user physical and digital activity profiles.

11. An apparatus for associating physical activities and digital activities of a user, said apparatus comprising:

at least one processor; and a computer readable storage medium having computer readable program code embodied therewith and executable by the at least one processor, the computer readable program code comprising:

computer readable program code configured to collect, within an application by creating traces identifying properties related to at least one physical activity of a user, a plurality of physical attributes relating to at least one physical activity of the user, via mining sensor data from at least one physical state associated with the user and a physical location of the user;

computer readable program code configured to collect, at the application by creating traces identifying properties related to at least one digital activity of the user, a plurality of digital attributes relating to at least one digital activity of the user, via mining data from a digital presence of the user;

computer readable program code configured to group, into a group of attributes, at least one of the plurality of the physical attributes and at least one of the plurality of the digital attributes based on a similarity measure, wherein the similarity measure involves identification of relatedness of at least one of the physical attributes to at least one of the digital attributes and predetermined filter criteria;

computer readable program code configured to generate a user signature from the grouped attributes and that indicates lifestyle habits of the user, wherein the generated user signature is updated responsive to collection of attributes; and computer readable program code configured to provide at least one application created from the generated user signature to at least one third party.

12. A computer program product for associating physical activities and digital activities of a user, said computer program product comprising:

at least one processor; and a computer readable storage medium having computer readable program code embodied therewith and executable by the at least one processor, the computer readable program code comprising:

computer readable program code configured to collect, within an application by creating traces identifying properties related to at least one physical activity of a user, a plurality of physical attributes relating to at least one physical activity of the user, via mining sensor data from at least one physical state associated with the user and a physical location of the user;

computer readable program code configured to collect, at the application by creating traces identifying properties related to at least one digital activity of the user, a plurality of digital attributes relating to at least one digital activity of the user, via mining data from a digital presence of the user;

computer readable program code configured to group, into a group of attributes, at least one of the plurality of the physical attributes and at least one of the plurality of the digital attributes based on a similarity measure, wherein the similarity measure involves identification of relatedness of at least one of the physical attributes to at least one of the digital attributes and predetermined filter criteria;

computer readable program code configured to generate a user signature from the grouped attributes and that indicates lifestyle habits of the user, wherein the generated user signature is updated responsive to collection of attributes; and computer readable program code configured to provide at least one application created from the generated user signature to at least one third party.

13. The computer program product according to claim 12, comprising computer readable program code configured to identify a subset of attributes from the grouping based on predetermined filter criteria.

14. The computer program product according to claim 13, wherein the subset of attributes comprises content specific to the user.

15. The computer program product according to claim 12, wherein the collecting of a plurality of the physical attributes comprises obtaining and processing stored sensor data.

16. The computer program product according to claim 15, wherein said processing of stored sensor data comprises using sensor data selected from the group consisting of: a location associated with the user, an automotive state, and an environmental state.

17. The computer program product according to claim 12, wherein the collecting of a plurality of digital attributes comprises processing stored Internet activity data.

18. The computer program product according to claim 12, wherein in the storing comprises employing a scalable cloud service for storage and for managing physical and digital cookies.

19. The computer program product according to claim 12, wherein the grouping comprises associating physical activities and digital activities via data entity matching.

20. A method comprising:

collecting, within an application by creating traces identifying properties related to (i) physical activities of a user and (ii) digital activities of the user, physical and digital data attributes of the user for a business enterprise;

querying said collected physical and digital attributes of a user; and brokering aggregate profiles of the user via:
- grouping, into a group of attributes, the physical and digital attributes of a user based on a similarity measure, wherein the similarity measure comprises an identification of relatedness of the physical and digital attributes and predetermined filter criteria;
- generating a user signature from the grouped attributes and that indicates lifestyle habits of the user, wherein the generated user signature is updated responsive to collection of attributes; and
- determining a target demographic from the physical and digital attributes of a user; and providing at least one application created from the generated user signature to the business enterprise for the target demographic.

\* \* \* \* \*